United States Patent [19]

Whaley

[11] 4,294,495
[45] Oct. 13, 1981

[54] BOOM SOCKETS

[75] Inventor: Morris L. Whaley, Chula Vista, Calif.

[73] Assignee: Morris Whaley, Inc., Chula Vista, Calif.

[21] Appl. No.: 84,852

[22] Filed: Oct. 15, 1979

[51] Int. Cl.³ .............................................. F16C 19/36
[52] U.S. Cl. .................................... 308/174; 212/253; 308/187; 308/207 R
[58] Field of Search .................. 212/70; 308/174, 187, 308/207 R, 214, 218, 231, 234

[56] References Cited

U.S. PATENT DOCUMENTS

| 1,997,573 | 4/1935 | Couch | 308/174 X |
| 2,547,398 | 4/1951 | Lee | 308/174 X |
| 3,247,621 | 4/1966 | Aller | 308/174 X |
| 4,002,377 | 1/1977 | Jangaard | 308/36.1 |

Primary Examiner—Frederick R. Schmidt
Attorney, Agent, or Firm—Le Blanc, Nolan, Shur & Nies

[57] ABSTRACT

A boom socket in which the gooseneck assembly and cross pin are supported in rolling contact bearings and in which the construction and materials eliminate free play and minimize corrosion and otherwise reduce maintenance to a minimum.

14 Claims, 3 Drawing Figures

BOOM SOCKETS

This invention relates to boom sockets and, more specifically, to novel, improved devices of that character.

My novel, improved boom sockets are particularly useful in shipboard applications, and the principles of my invention will accordingly be described primarily with reference to such applications. It is to be understood, however, that this is being done for clarity and brevity and is not intended to limit the scope of the invention as defined in the appended claims.

Booms are used aboard ship and in other applications to hoist and transfer loads from one location to another. For the boom to be useful, it must be able to pivot about orthogonally related, horizontal and vertical axes so that the outer end of the boom (which is a long arm or spar) can be raised and lowered and traversed from one location to another.

This is accomplished by attaching the boom heel to a boom end which is pivotally mounted on a horizontal cross pin supported from a gooseneck. The gooseneck is, in turn, fixed to the upper end of a vertical pin which is rotatably supported in a housing typically designed for attachment to a stationary structure such as a mast or deck, for example.

Heretofore, the vertical pin has typically been rotatably mounted in conventional journal or other sliding bearings; and vertical loads on the gooseneck/heel pin assembly have been taken up by an equally conventional thrust washer. Typical prior art boom sockets of the character just described are shown in FIGS. 1 and 2 and 3-6, respectively, of U.S. Pat. No. 4,002,377 issued Jan. 11, 1977, to Jangaard.

Prior art boom sockets are lubricated via grease fittings at those locations where there is rubbing friction between relatively movable parts or by disposing the bearings in an oil-filled housing. Conventional boom sockets of the type first mentioned require that a strict lubrication schedule be observed; and they typically have a short service life attributable at least in part to neglect of the lubrication schedule.

Boom sockets with oil-filled housings represent an improvement but nevertheless have their drawbacks. Especially in harsh marine environments, such sockets have a tendency to leak oil. Furthermore, the heavy loads repeatedly encountered force the lubricant from between the thrust washer and that component of the gooseneck assembly it supports and from between the vertical pin and its journal bearings. Galling leading in some cases to complete seizure is the inevitable result just as it is in conventional, grease lubricated boom sockets. Whether or not a complete seizure occurs, galling produces an unstable boom which cannot be safely operated, and causes excessive wear.

I have now eliminated the drawbacks of the above-discussed prior art boom sockets by eliminating all sliding friction and substituting rolling contact in its place, preferably by employing tapered roller bearings or comparable devices capable of absorbing both radial and thrust loads. The bearings are mounted with zero clearances in a housing sealed against the escape of the heavy duty greases I employ as lubricants. Furthermore, extensive use is made of corrosion resistant metals such as stainless steels in areas susceptible to rusting in marine and other harsh environments.

The result is a boom socket which is almost maintenance free and which has a significantly extended service life. An increased load capacity is another decided advantage of the novel boom sockets just discussed.

Yet another important advantage of my novel boom sockets is that any play which may develop by wear, or in other ways, can be eliminated by simply tightening the bearings to reestablish the initial zero clearances. In contrast, refurbishment of a conventional boom socket requires extensive machining and retooling, a costly and time consuming process.

From the foregoing, it will be obvious to the reader that the primary object of the present invention resides in the provision of novel, improved boom sockets.

Other also important but more specific objects of the invention reside in the provision of boom sockets:

(1) which have an extended service life;

(2) in which, in conjunction with the preceding object, rolling contact bearings are employed to eliminate the undesirable sliding contact present in prior art boom sockets;

(3) which, in conjunction with the first numbered object, are so designed and fabricated as to be especially resistant to marine and comparably harsh environments;

(4) which, in conjunction with the first numbered object, are so designed that adequate lubrication of moving parts is guaranteed essentially without observing a servicing schedule;

(5) which are essentially maintenance free but can be easily serviced when necessary;

(6) which are capable of withstanding heavier loads than conventional boom sockets;

(7) which have various combinations of the foregoing attributes.

Other important objects and features and additional advantages of the present invention will become apparent from the appended claims and as the ensuing detailed description and discussion proceeds in conjunction with the accompanying drawing, in which:

Figure 1:
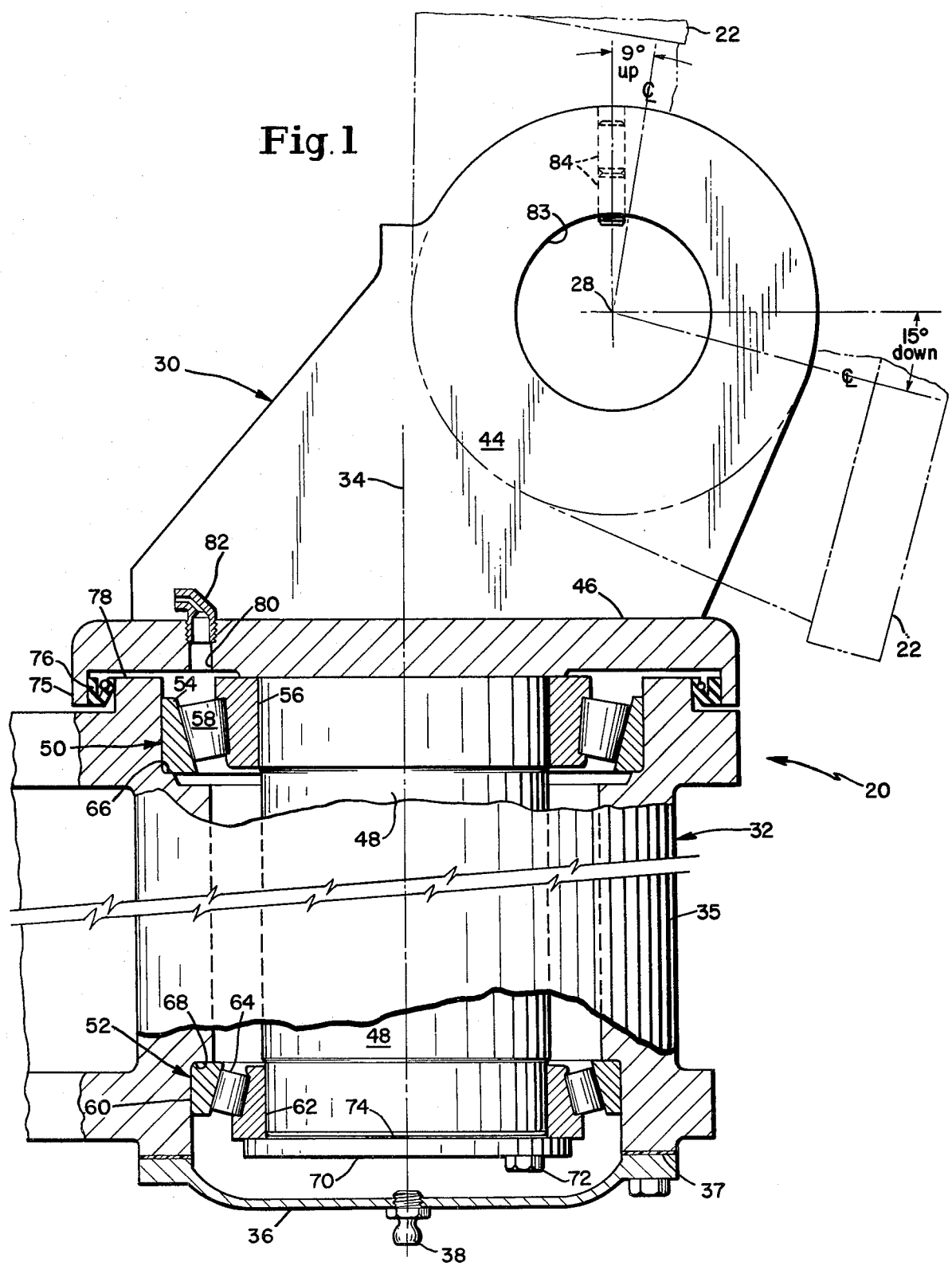
FIG. 1 is a partly sectioned side view of a boom socket embodying and constructed in accord with the principles of the present invention.

Referring now to the drawing, FIGS. 1-4 depict a boom socket 20 embodying and constructed in accord with the principles of the present invention.

The boom socket components are in some ways of conventional character. To the extent that they are, such details will not be described herein.

The major components of boom socket 20 include a boom end 22 to which the heel of boom 24 is attached, a cross pin 26 supporting boom 24 and boom end 22 for rotation about a horizontal axis 28, a gooseneck assembly 30 in which cross pin 26 is mounted, and a boom socket housing 32 in which the gooseneck assembly is mounted for rotation about a vertical axis 34, thereby giving boom 24 unlimited degrees of freedom of movement. Boom socket housing 32 is designed to be mounted on a mast, deck, or other stationary structure and to be packed with a lubricant of a character described below.

As best shown in FIG. 1, housing 32 is made up of a generally cylindrical casting 35 and a pan-shaped sump 36 bolted or otherwise removably fastened to, and closing the opening in, the lower end of casting 35. A gasket 37 keeps lubricant from leaking through the gap between casting 35 and the sump 36.

Lubricant is introduced into housing 32 by way of a conventional zerk fitting 38 threaded into sump 36.

The gooseneck assembly 30 supported in housing 32 consists of a vertically extending, plate-like, gooseneck proper 44 mounted on a circular, horizontal flange 46 and a vertical pin 48 (see FIG. 1).

The gooseneck assembly is supported in housing 32 for the above-discussed rotation about vertical axis 34 by upper and lower tapered roller bearings 50 and 52 which absorb thrust loads imposed on the gooseneck assembly as well as radial loads. Loads are carried primarily by upper bearing 50 with the lower bearing being employed for stability and balance.

The uppper bearing includes: a generally wedge sectioned outer race or cup 54, an inner race or cone 56 and tapered rollers 58. Lower bearing 52 has wedge-shaped outer and inner races 60 and 62 and rollers 64.

The outer race 54 of upper bearing 50 is seated on an upwardly facing, circular ledge 66 in housing component 35. The outer race 60 of lower bearing 52 is seated against a similarly configured, downwardly facing ledge 68 formed in, and toward the lower end of, component 35.

Gooseneck assembly flange 46 is engaged by, and rotates with, the inner race 56 of upper bearing 50.

The vertical pin 48 and upper and lower bearings are secured to each other and in place in casting 35 by a lock plate 70. That component engages the inner race 62 of lower bearing 52. It is secured in place as by bolts 72 which extend through the lock plate and are threaded into vertical pin 48.

In assembling boom socket 20, shims 74 (only one of which is shown) are installed between lock plate 70 and the bottom end of vertical pin 48.

As discussed above, boom socket 20 is preferably assembled with zero clearance between the components just discussed. As components wear, shims 74 can be removed, lock plates 70 replaced, and bolts 72 retightened, shifting the inner races 56 and 62 of the upper and lower bearings downwardly and upwardly with the respect to the outer races of those bearings and thereby eliminating play in the boom socket components by restoring the initial, zero clearances.

As discussed above, this is a far more expeditious method of refurbishment than the machining and retooling required to put a worn, conventional boom socket back into service.

The lower side of gooseneck assembly flange 46 is configured to clear the upper end of housing component 35, and a depending, peripheral skirt 75 is formed around the flange. A circular seal 76 spanning the gap between skirt 75 and a vertically extending boss 78 on casting 35 keeps lubricant from leaking out of boom socket housing 32.

A port 80 through flange 46, closed by vent check 82, is provided so that air can be evacuated from the interior of boom socket housing 32 before it is filled with lubricant. This insures that the interior of the housing will be completely packed.

The preferred lubricants are Lubriplate and comparable heavy duty greases.

Figure 2:
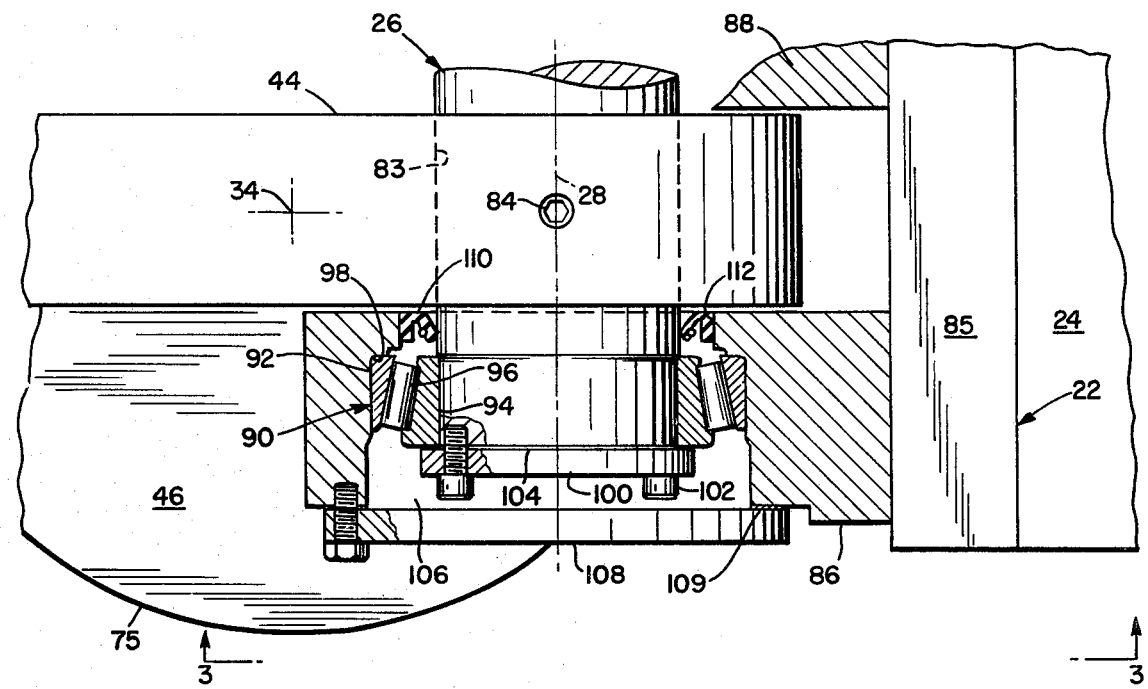
FIG. 2 is a fragmentary, partly sectioned plan view of the boom socket.
Figure 3:
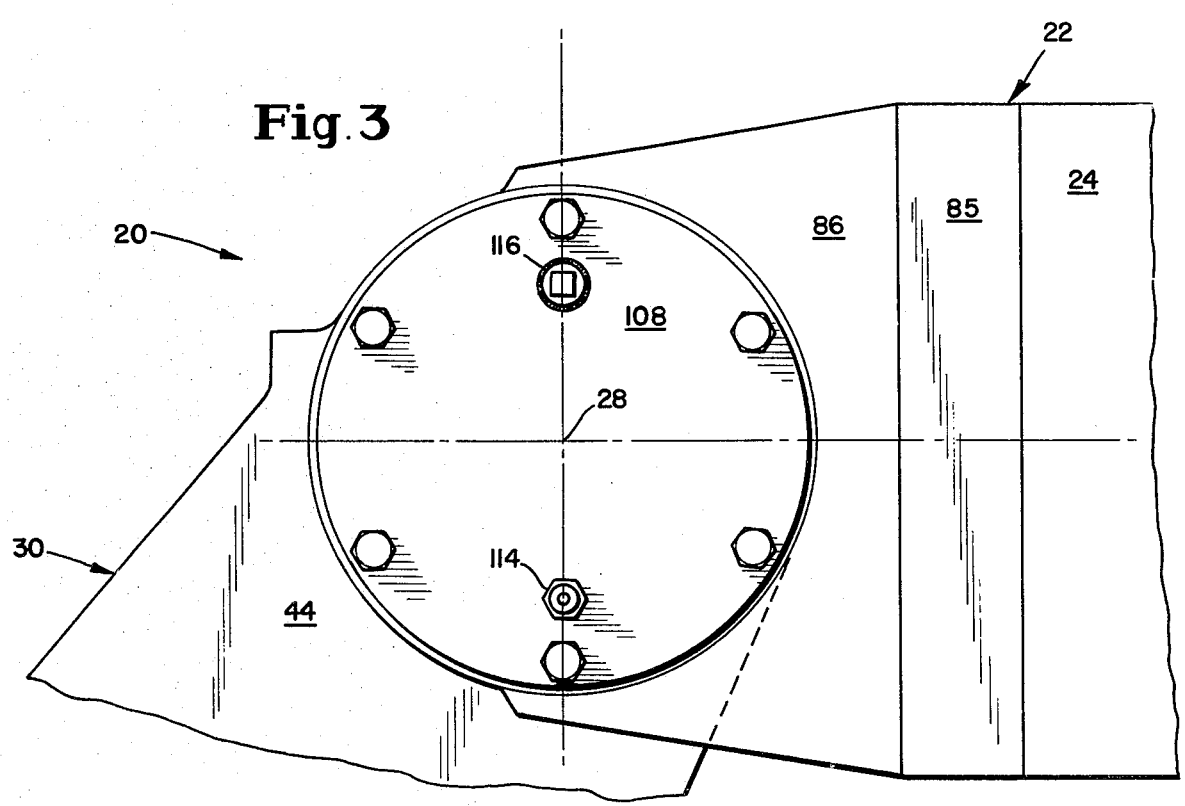
FIG. 3 is a partial view of the boom socket looking generally in the direction of arrows 3—3 of FIG. 2.

An aperture 83 is formed through gooseneck 44 adjacent the upper end of the latter as shown in FIGS. 1 and 2. Cross pin 26 is press fitted in this aperture or opening and retained in place by set screws 84.

The boom end 22 rotatably supported on cross pin 26 has a plate 85, to which the boom heel is attached, and brackets 86 and 88 which extend normally from mounting plate 85. The brackets embrace gooseneck 44 as shown in FIG. 2.

Boom end brackets 86 and 88 are rotatably supported on those portions of the cross pin protruding from gooseneck 44 in identical fashion. Consequently, only one mounting arrangement has been shown in FIG. 2.

It includes a tapered roller bearing 90 which surrounds cross pin 26 and includes outer and inner races 92 and 94 with rollers 96 therebetween.

The outer race 92 of the bearing is seated against an outwardly facing circular seat 98 formed in bracket 86, and the inner race of the bearing is fitted on the cross pin. The foregoing components are retained in the relationship shown in FIG. 2 by a lock plate 100. The lock plate engages the inner race 94 of the bearing and is secured in place as by cap screws 102 which extend through the lock plate and are threaded into cross pin 26.

As in the mounting arrangement for vertical pin 48, shims 104 (only one is shown) are installed between the lock plate and the end of the cross pin so that play can be eliminated as wear occurs.

A sealed chamber 106 is provided in bracket 86 by a cover plate 108 bolted to the outer side of the bracket, a gasket 109, and a seal 110 surrounding the cross pin and extending between it and the surface of a circular opening or aperture 112 through the bracket. Chamber 106 is packed with grease of the character described above by way of a zerk fitting 114 with air being ejected through a vent check 116.

One exemplary boom socket in accord with the principles of the present invention is designed to withstand loads of up to 50,000 lbs. Its cross pin 26 is five inches in diameter, and the two bearings 90 supporting boom end 22 from the cross pin are each capable of carrying radial and thrust loads in excess of 44,940 and 30,375 pounds.

The cross pin is supported by a gooseneck 44 which is four inches wide.

Vertical pin 48 is 7.5 inches in diameter. The upper bearing 50 by which the heel pin is rotatably supported in boom socket housing 32 is capable of carrying radial and thrust loads in excess of 90,525 and 93,050 pounds. The lower bearing 52 employed for stability and to provide a balanced assembly is capable of carrying radial loads in excess of 50,500 pounds and thrust loads of more than 40,800 pounds.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A boom socket or the like, comprising: a housing; a gooseneck assembly comprising a vertical pin and a gooseneck at the upper end thereof; means comprising vertically spaced, upper and lower tapered roller bearings rotatably supporting said vertical pin in said housing for rotation about a vertical axis; a boom end; and means for rotatably supporting said boom end for rotation about a horizontal axis from said gooseneck comprising a cross pin extending through said gooseneck, boom end brackets embracing said gooseneck, and tapered roller bearings surrounding the respective end of said cross pin for rotatably supporting said boom end brackets from the respective ends of said cross pin.

2. A boom socket as defined in claim 1 in which the minor diameters of the rollers in said upper and lower bearings face downwardly and upwardly, respectively.

3. A boom socket as defined in claim 1 in which said upper and lower tapered roller bearings have inner and outer races and rollers therebetween, one race of each bearing being wedge-shaped and said boom socket further includes means for displacing said races relative to each other in a direction paralleling the axial centerline of said vertical pin to thereby adjust the play in the movable components in the housing.

4. A boom socket as defined in claim 1 in which said gooseneck assembly includes a horizontal flange at the upper end of said vertical pin, said flange being supported from the inner race of said upper bearing; there being an internal ledge in said housing; and the outer race of said upper bearing being seated on said ledge, thereby vertically positioning said gooseneck assembly relative to said housing; and there being a clearance between said flange and the upper end of said housing to permit free rotation of said gooseneck assembly relative to said housing.

5. A boom socket as defined in claim 4 in which said flange has a depending peripheral skirt surrounding the upper end of said housing, there being a seal between said housing and said skirt to keep lubricant from leaking from said housing.

6. A boom socket as defined in claim 4 wherein there is a downwardly facing internal ledge in said housing against which the outer race of said lower bearing is seated and wherein there is a lock plate fixed to the bottom of said vertical pin and engaging the inner race of said lower bearing on the lower side thereof to thereby fix said bearings and said gooseneck assembly in position in said housing.

7. A boom socket according to claim 1 together with means forming a lubricant sump fixed to the bottom of said housing.

8. A boom socket according to claim 1 together with a first means for bleeding air from the interior of said housing and a second means for supplying a lubricant thereto.

9. A boom socket according to claim 1 together with outwardly facing internal ledges in said boom end brackets against which the outer races of the bearings surrounding the cross pin are seated and means for securing said bearings surrounding the cross pin in place comprising lock plates engageable with the inner races of said bearings surrounding the cross pin and means fixing the lock plates to the ends of said cross pin.

10. A boom socket as defined in claim 1 in which the minor diameters of the rollers in both of said bearings surrounding the cross pin face said gooseneck.

11. A boom socket as defined in claim 1 in which at least one race of each bearing surrounding the cross pin is wedge-shaped, said boom socket further including separate means for displacing said bearing races of each bearing surrounding said cross pin relative to each other in directions paralleling the axial centerline of the cross pin to thereby adjust the play between said cross pin and said boom end brackets.

12. A boom end socket as defined in claim 1 which includes means for supplying lubricant to the interiors of said boom end brackets.

13. A boom end socket as defined in claim 12 in which each of said boom end brackets has a radial projection surrounding said cross pin, there being seals surrounding said cross pin and extending between said cross pin and said projections for keeping lubricant from leaking from between said projections and said cross pin.

14. A boom socket as defined in claim 1 in which at least those portions subject to penetration therebetween by corrodants from the ambient surroundings are fabricated of a corrosion resistant metal.

* * * * *